Nov. 11, 1952  J. MARTKA  2,617,370
MACHINE FOR MAKING VIENNA ROLLS
Filed July 22, 1949  4 Sheets-Sheet 1

INVENTOR.
JOHN MARTKA
BY J. Ledermann
ATTORNEY

Nov. 11, 1952

J. MARTKA 2,617,370

MACHINE FOR MAKING VIENNA ROLLS

Filed July 22, 1949

INVENTOR.
JOHN MARTKA
BY
F. Ledermann
ATTORNEY

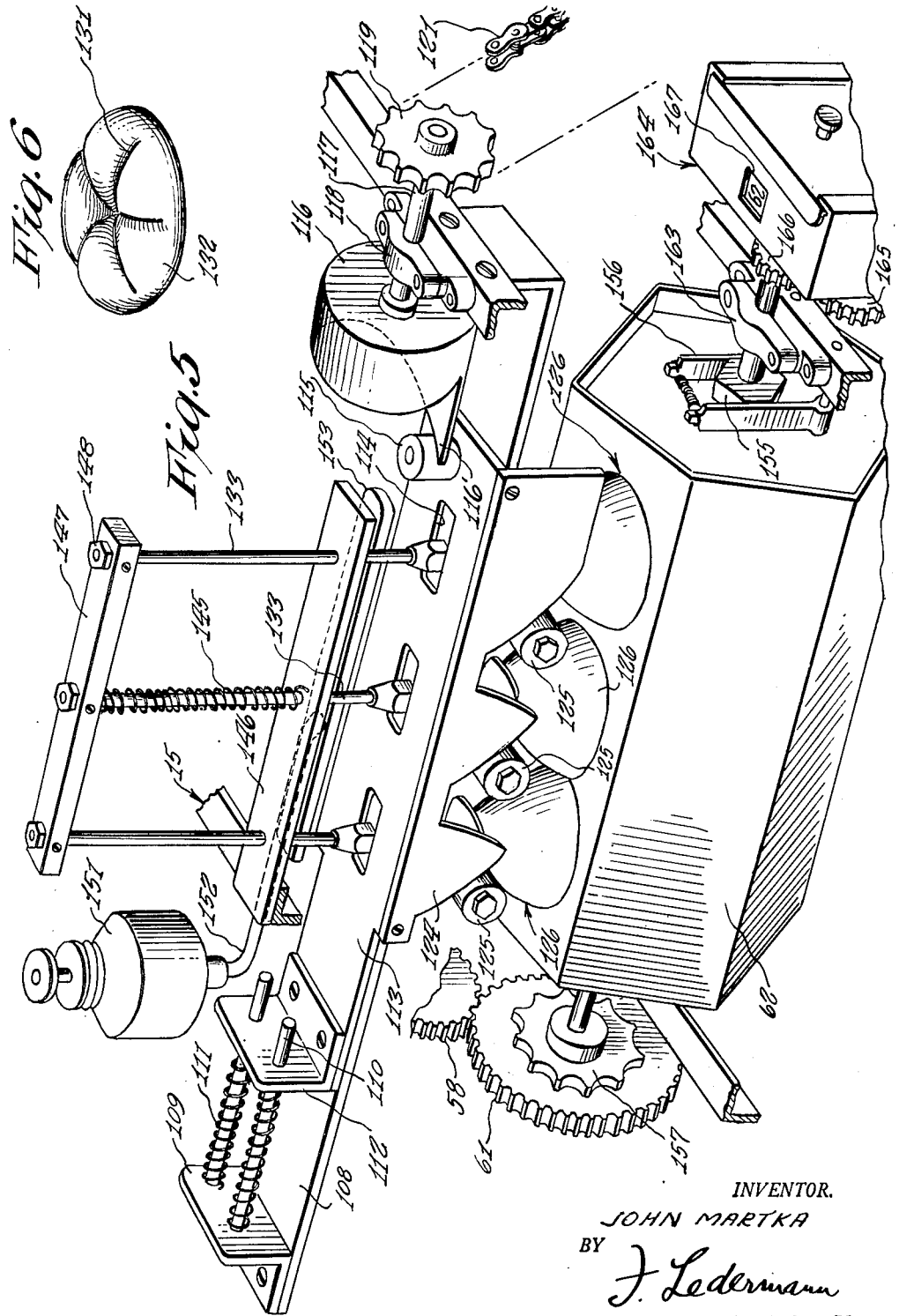

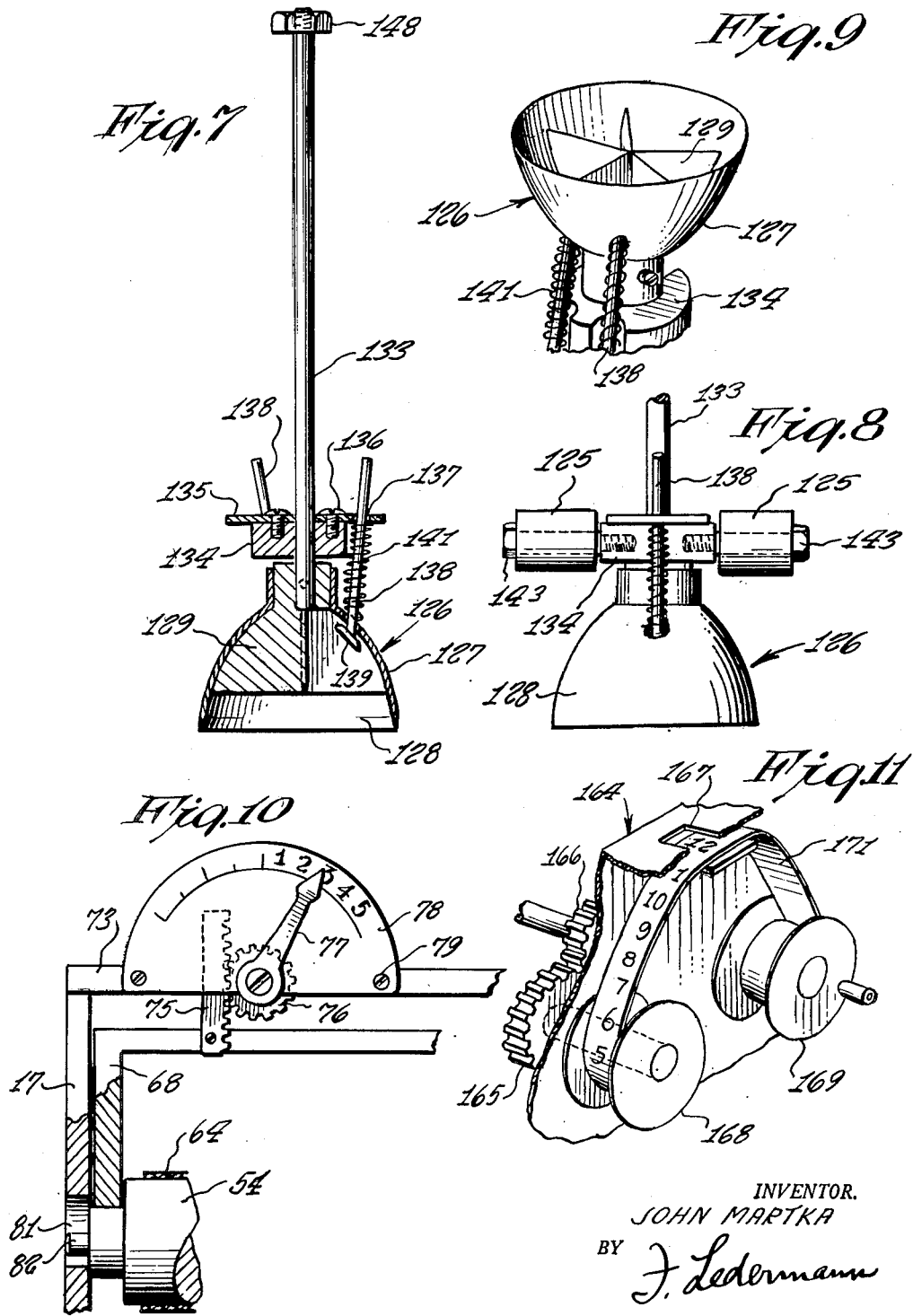

Patented Nov. 11, 1952

2,617,370

UNITED STATES PATENT OFFICE 2,617,370

MACHINE FOR MAKING VIENNA ROLLS

John Martka, Brooklyn, N. Y.

Application July 22, 1949, Serial No. 106,169

6 Claims. (Cl. 107—20)

This invention relates to a cookie cutting and forming machine.

It is an object of the present invention to provide an automatic cookie cutting and forming machine wherein upon placing of dough within the machine the dough is automatically rolled and formed into a sheet from which cookies are cut automatically and wherein the cut cookies are delivered to a conveyor to be removed therefrom for the purpose of placing them in the oven for cooking treatment and wherein there is provided means for adjusting the thickness of the sheet material for the different thicknesses of cookie to be formed and a counting mechanism to automatically count off the number of cookies which have been formed and delivered.

It is another object of the present invention to provide in a cookie cutting and forming machine a simple mechanism for effecting the cutting operation and wherein this mechanism has a discharge arrangement for dropping the cookies out of the cutting members and onto a flat sided rotary member which will dump the cut cookies onto a conveyor.

It is another object of the present invention to provide cutting elements adapted to be connected to a common plate and which are separable as individual units therefrom for the purpose of being cleaned and which as units can be easily disassembled and reassembled and wherein their discharging action as well as their cutting action will be formed automatically by cam operated mechanism operated in synchronism with the other parts of the machine and with the flat sided member adapted to receive the cut cookies.

Other objects of the present invention are to provide a cookie cutting and forming machine which is of simple construction, inexpensive to manufacture, automatic in operation, easily adjusted to different thickness of cookies, compact and consumes little space, self-contained and has few parts to get out of order, convenient to use and efficient in operation.

For other objects and for a better understanding of the invention, reference may be had to the following detailed description taken in connection with the accompanying drawing, in which:

Fig. 3 is a fragmentary sectional view of the machine looking upon the motor drive mechanism and as viewed on line 3—3 of Fig. 1.

Fig. 4 is an enlarged sectional view taken generally on line 4—4 of Fig. 2.

Fig. 5 is an enlarged fragmentary and perspective view looking upon the delivery end of the machine and upon the cookie cutting elements and the flat sided rotary element.

Fig. 6 is a perspective view of one of the cookies cut by the forming mold of this machine.

Fig. 7 is a vertical sectional view of the cutting mold assembly.

Fig. 8 is a fragmentary elevational view of the cutting mold assembly.

Fig. 9 is an inverted perspective view of the cutting mold assembly and looking into the bottom thereof and the forming portion lying within.

Fig. 10 is a fragmentary elevational view of the adjusting mechanism for regulating the thickness of the cookie material.

Fig. 11 is a fragmentary view of the counting mechanism.

Figure 1:
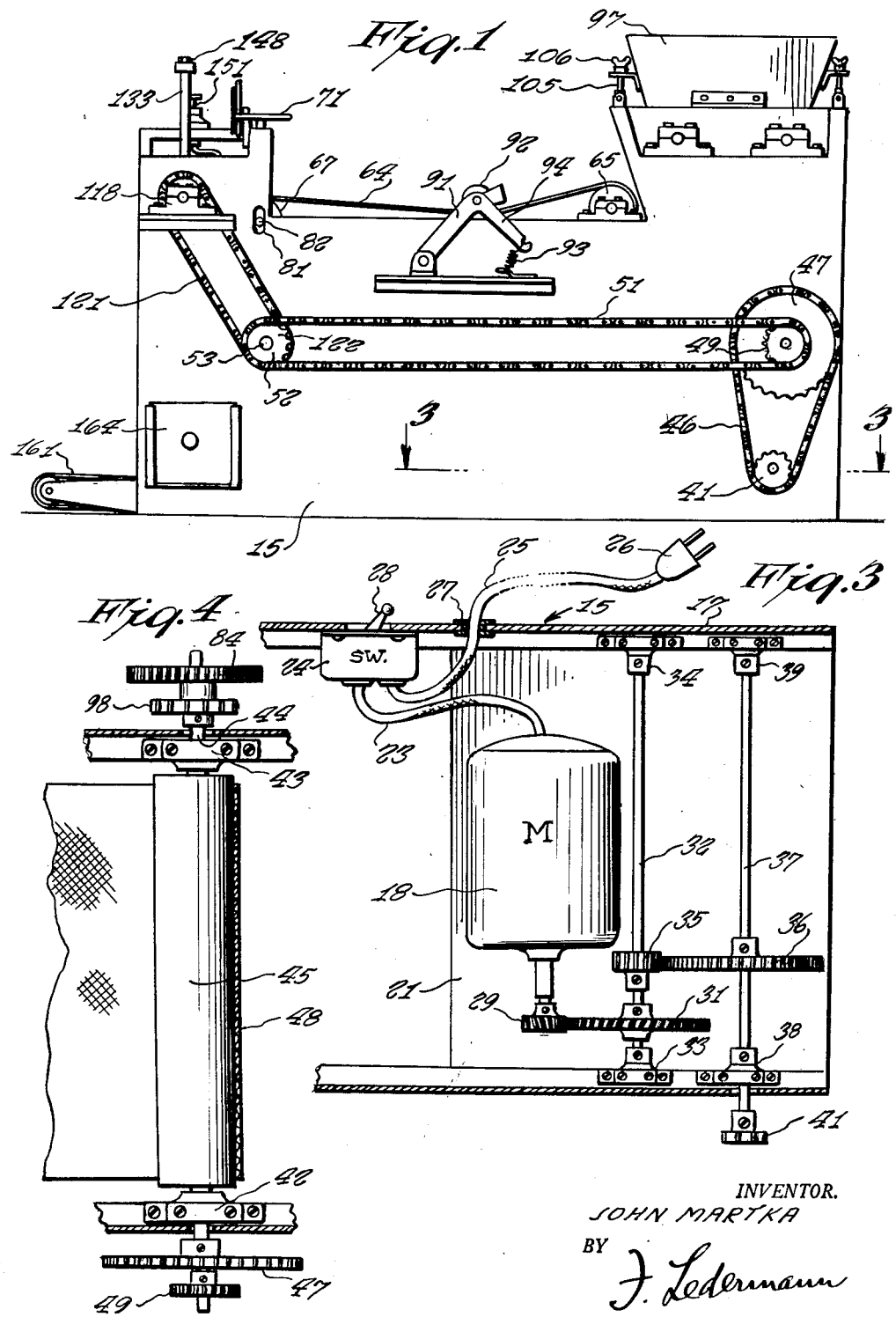
Fig. 1 is a side elevational view of the machine embodying the features of the present invention.

Referring now to the figures, 15 represents a frame comprising a base 16 and upright portions 17. Resting upon the base is an electric motor 18 having a base 19. This base is secured to a transverse plate 21 upon the base by fastening screws 22. An electric cable 23 extends from the motor to an electric switch 24 mounted upon the side or upright portions 17. From this switch extends an electric supply cable 25 having a plug 26 thereon adapted to fit any wall receptacle. This cable extends through a grommet 27 in the portions 17. The switch has an operating lever 28 accessible from the exterior of the machine and can be turned on to start the electric motor 18 and off to stop the operation of the same. The electric motor has a pinion 29 which meshes with a gear 31 on a shaft 32 journalled between the upright portions in bearings 33 and 34, Fig. 3. The shaft 32 has a gear 35 which meshes with a large gear 36 on shaft 37 journalled in the upright portions 17 by means of bearing brackets 38 and 39. The shaft 37 extends exteriorly of the upright portions 17 and has a pinion 41 thereon.

Lying above the shaft 37 and journalled in brackets 42 and 43 in the upright portions, Fig. 4, is a roller shaft 44 having a roller 45 fixed therewith. The sprocket pinnion 41 has a sprocket chain 46 connected to it and which extends to a large sprocket 47 fixed on the shaft 44, Figs. 1 and 4, to drive this shaft 44, the roller 45 and conveyor belt 48 extending over the roller.

Also on the shaft is a small sprocket 49, Fig. 4, which is connected by a sprocket chain 51 with a sprocket 52 on a shaft 53 of a belt roller 54 carrying the belt 48. This shaft 53 has a gear 55 with a dwell portion 56 thereon and with teeth 57. The teeth 57, when they come into relationship with a gear 58, Fig. 2, on a shaft 59 and serving as an idler gear, will drive the gear 58 to in turn drive a large gear 61 on which a flat sided rotatable element 62 is fixed and against the sides of which cookies are formed in a manner to be hereinafter described. The belt conveyor 48 is supported upon a sheet deck 63.

Above the belt 48 is a top belt 64 carried upon rollers 65 and 66 journalled upon a frame 68 having a bottom plate 69 against which the belt 64 can be pressed and wherein upon adjustment of the frame 68, the belt 64 can be brought closer to the belt 48 or elevated to a greater extent therefrom. The adjustment is effected by a wheel 71 having a shaft 72 extending through a top piece 73 forming a part of the upright portions of the frame. In order that indications can be given as to the thickness of the cookie material to be passed by the belts 48 and 64, a rack element 75 is made secure to the adjustable frame 68 and this rack element meshes with a pinion 76 having an indicating arm 77 fixed to the same and adapted to be adjusted over an indicating plate 78 fixed by screws 79 to the top part 73 on the upright portions 17 of the frame, Fig. 10. A guide slot 81 is provided in the frame portions 17 to receive extension 82 of the conveyor roller 54 to retain the frame 68 and the conveyor roller 54 against longitudinal displacement.

Figure 2:
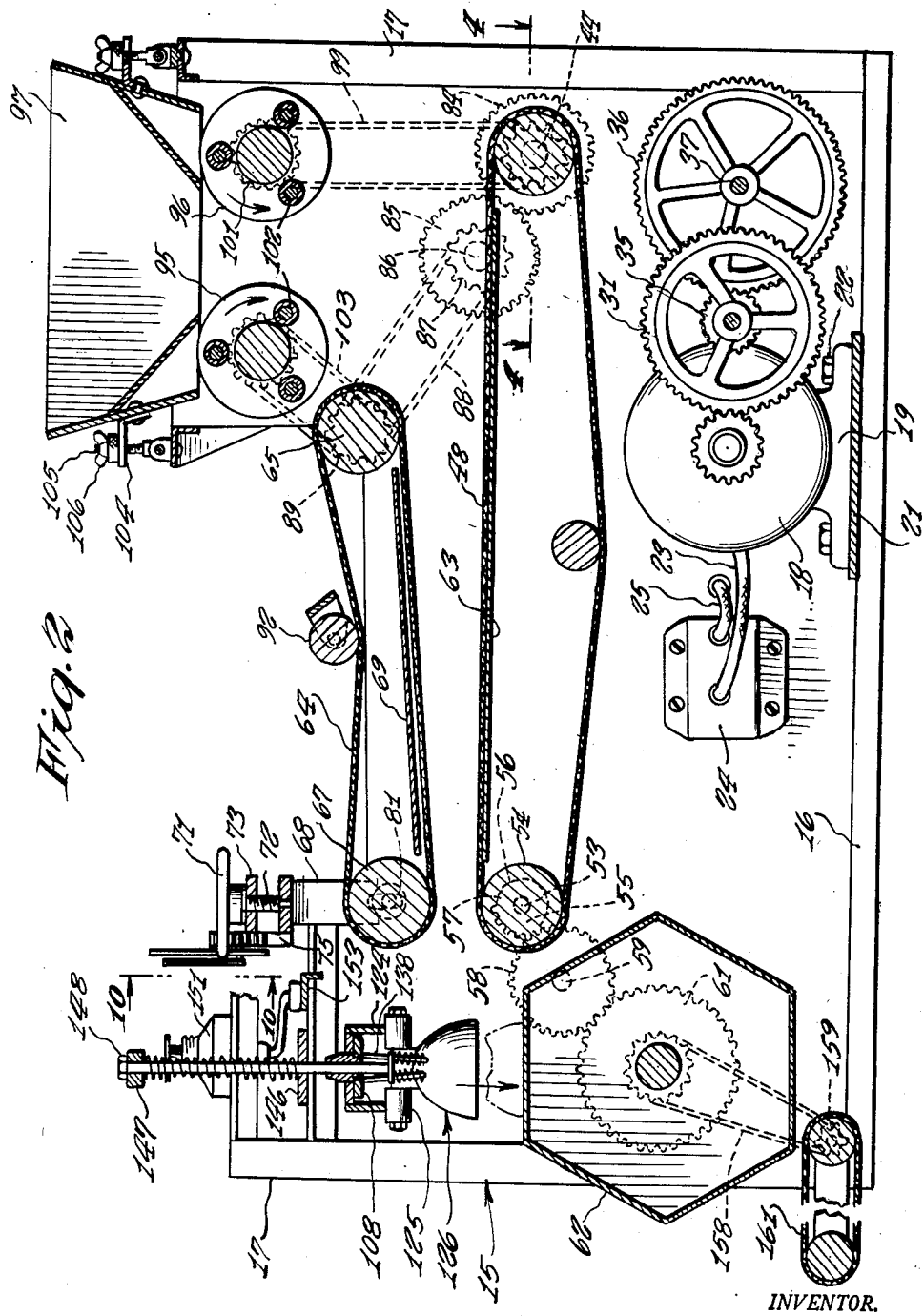
Fig. 2 is a longitudinal sectional view of the machine.

On the shaft 44 is a gear 84, Fig. 4, which meshes with a gear 85 on a shaft 86 journaled in the upright portions, Fig. 2, and which in turn has a sprocket 87 connected by a chain 88 with a sprocket 89 fixed to the roller 65 of the upper belt 64. A belt tightener device 91 is mounted on the upright portions and has a roller 92, Fig. 1, which is held downwardly against the belt 64 to keep it tightened. A tension spring 93 acts upon an arm 94 carrying the roller 92.

Above the rear end of the belt 48 are two rollers 95 and 96. Above these rollers is a removable hopper 97 into which the cookie dough can be extended to be fed to the rollers 95 and 96 and from the rollers to the conveyor belt 49 to be flattened to the size desired depending upon the adjustment of the adjusting wheel 71 and of the upper belt arrangement 64. Shaft 44 has a sprocket 98 which is connected by a chain 99 to a sprocket 101 on the roller 96. The rollers 95 and 96 include transverse bars 102 respectively which cling to the dough to pull the same from the hopper 97. The roller 95 is driven from the belt roller 65 through a chain 103. The hopper 97 has brackets 104 extending from the same adapted to respectively receive locking bolts 105 which are fixed to the brackets by wing nuts 106.

The dough, upon passing between the belts, is flattened to the proper thickness and is deposited upon one of the flat sides of the flat sided rotatable support 62.

Above the flat sided rotary support 62 is a transversely extending plate 108, Fig. 5, which carries upstanding bracket 109 with longitudinally extending pins 110 extending therefrom and about which are springs 111. These springs react against an abutment or bracket 112 fixed to a sliding plate 113 which has a plurality of longitudinally spaced elongated slots 114 and an upstanding roller 115 thereon. This roller is engaged by a rotary cam 116 fixed to a shaft 117 journalled in a bearing bracket 118 mounted upon the frame 10. This cam 116 will cause the sliding plate 113 to be moved laterally against the action of the springs 111 and the springs upon the roller 115 being dropped from high point 116' on the cam will return the plate 113 to the right as viewed in Fig. 5. The shaft 117 has a sprocket 119 that is operated by a sprocket 121 connected with a sprocket chain 122 on the shaft 53 of the roller 54 of the lower belt 48.

The sliding plate 113 carries a depending cam plate 124 engaging with rollers 125 respectively of cookie forming mold assemblies 126.

These assemblies 126 have an inverted cutting cup 127 with a cutting edge 128 and an inner forming part 129 having radially extending ribs for forming depressions 131 in the cookie, Fig. 6. The part 129 has a stem 133 extending upwardly. Above the member 129 on the stem 133 is a bracket 134 having a plate 135 secured to it by screws 136. In the plate 135 are holes 137 through which pass respectively pushing elements or rods 138 for removing the cut and formed cookie from the mold assembly. This element 138 has an enlargement 139 thereon and is surrounded by spring 141 normally urging the rod 138 upward and hence normally holding the head 139 thereof against the ceiling or interior surface of the cup 127. Rollers 125 are carried upon the bracket 134 by screws 143. As the cam 124 engages the rollers 125, the mold assemblies are brought over the flattened cookie dough to form the cookie shown in Fig. 6 and as the sliding plate and the cam 124 is returned under the action of the springs 111, the mold assemblies will be lifted by a vertically extending spring 145 on shank 133 of one of the mold assemblies 126, and which reacts against a laterally extending fixed plate 140 on the frame and a top piece 147 through which all of the shanks 133 of the mold assemblies extend. These shanks have fastening nuts 148 which are engaged by the piece 147. The spring 145 will accordingly raise the assembly to allow for the next advancement of the dough onto the flat sided rotatable support 62.

The pushing elements 138 will engage with the bottom face of the fixed plate 108 so as to push downwardly upon the raised cookie portions to remove the cookie from the inverted cup-shaped member 127 and the forming member 129.

An adjustable fluid container 151 is mounted on the frame 15 and distributes through a tube 152 a fluid for deposit on a plate 153 to be dripped upon the cookie dough. This fluid may prevent the cutting cup from sticking to the dough after the cookie has been cut.

The rotatable support 62 has a flat sided portion 155 on which a braking arrangement 156 acts to retain the supports as each flat side of the support is stepped to its position to receive the cutting and forming assemblies. The rotatable support carries a sprocket 157 which connects by a chain 158 with a small sprocket 159 of a discharging conveyor device 161 disposed beneath the supports and adapted to receive the cut cookies 132 to discharge them upon a cookie sheet or into a container or the like.

The rotary support is journaled in bearing brackets 163, Fig. 5, and extending laterally therefrom is a counting device 164 having a gear 165 meshing with a gear 166. Through a window 167 of the counting device the number of cookies which have been cut can be read. This counting device can be viewed more clearly in Fig. 11 and includes internal reels 168 and 169 over which a tape 171 bearing numbers is extended.

It should now be apparent that there has been provided an automatic cookie cutting and forming machine wherein a rotatable flat sided support is operated in step by step fashion to bring the flat sides beneath the cutting and forming devices and to receive the dough preparatory to the operation of the cutting and forming devices which, at the proper timing interval, are brought onto the cookie dough to sever the cookies 132 therefrom. Automatically the cookie cutting devices are elevated and their pushing elements will extract the cookies from the inverted cup shaped members and drop them onto the flat sided portions of the rotatable support. The rotatable support will then be rotated to the next station and the cut elements will be dropped therefrom onto a discharging conveyor which is run in timed relation with the rotatable support. The stepping movement of the rotatable support is effected through the gear 55 having the dwell portion 56 and the teeth portion 57, Fig. 2.

While various changes may be made in the detail construction, it shall be understood that such changes shall be within the spirit and scope of the present invention as defined by the appended claims.

What is claimed is:

1. A machine comprising a frame having an elongated horizontal plate supported thereon in elevated position, an elongated slide plate superimposed and slidably mounted on said first plate, resilient means normally urging said slide plate in one longitudinal direction on said first plate, said slide plate having an abutment thereon extending from one side thereof, an elongated horizontal support secured to the frame above and in spaced parallel relationship with said plates, said support having spaced openings therethrough, said plates having similarly spaced openings therethrough in alignment with said support openings, vertical stems slidably mounted in said aligned openings and protruding above said support, a rigid member rigidly joining the upper portions of said stems, resilient means normally urging said stems upward, dough cutting elements secured to the lower extremities of said stems below said first plate, a cam rotatably mounted on said first plate and having a cam surface actively positioned adjacent said abutment for engagement with said abutment during a portion of the cycle of said cam, said cam upon rotation thereof during said portion of its cycle forcing said slide plate against the force of said first-named resilient means in the opposite longitudinal direction on said first plate, said slide plate having extending downward from one lateral edge thereof a plurality of cam elements, each of said cam elements being positioned substantially adjacent one of said openings through said slide plate, each of said stems having a bracket thereon above and adjacent the said cutting element thereof, said bracket having an abutment extending therefrom substantially at right angles to its corresponding said cam element and in surface contact therewith whereby upon sliding of said slide plate in said opposite direction said cam elements urge said last-named abutments downward and hence cause said stems and said cutting elements to descend, a member positioned under said cutting elements and having a flat surface positioned parallel with said plates, said surface being adapted to have a sheet of dough thereon adapted to be cut by said cutting elements upon descent of the latter as aforesaid, and means for rotating said first-named cam.

2. The machine set forth in claim 1, said last-named member being rotatably mounted on a horizontal axis, said last-named member being polygonal in cross-section and hence having a plurality of flat surfaces, said first-named flat surface constituting one of said plurality of flat surfaces, means for rotating said last-named member including a step by step drive for rotating said member intermittently to present said flat surfaces successively in horizontal position directly under said cutting elements, and means for actuating said cam rotating means and said means for rotating said last-named member.

3. The machine set forth in claim 1, said first-named resilient means comprising, said first plate having a projection from one side thereof adjacent one end thereof, said slide plate having a similar projection thereon extending in the same direction as said first-named projection and having spaced holes therethrough, horizontal rods secured at one end to said first-named projection and extending slidably through said holes, and compression springs surrounding said last-named rods between said projections.

4. The machine set forth in claim 1, said second-named resilient means comprising a compression spring surrounding one of said stems between said support and said rigid member.

5. The machine set forth in claim 1, each of said cutting elements comprising an inverted cup having an opening therethrough spaced from the axis of the said stem thereof, the said stem having a plate thereon at right angles thereto positioned above said cup, said last-named plate having an opening therethrough aligned with said cup opening, a rod slidably mounted in said aligned openings through said last-named plate and said cup and having a head on the lower end thereof within said cup, a coiled spring surrounding said rod between said last-named plate and said cup normally urging said rod upward to maintain said head against the interior surface of said cup, the length of said rod above said last-named plate being sufficiently greater than the vertical distance of travel of said stem and hence said cup to cause the upper end of said rod to engage said first plate before said stem reaches the upper extremity of the upward stroke thereof said first-named plate thereby depressing said rod to cause said head to free cut dough from the cup.

6. The machine set forth in claim 1, each of said cutting elements comprising an inverted cup having a plurality of circumferentially spaced openings through the wall thereof spaced equidistantly from the axis of the said stem thereof, said stem having a plate thereon at right angles thereto above said cup, said last-named plate having a like plurality of openings therethrough spaced equidistantly from said axis at a greater distance from said axis than the distance of said circumferential openings from said axis, each of said first plurality of openings lying in a common vertical plane through said axis with one of said second plurality of openings thereby providing pairs of vertically spaced aligned openings, each of said pair of aligned openings having a rod slidably mounted therein, said rod having a head on the lower end thereof, a coiled spring surrounding each of said rods between said cup and said last-named plate and normally urging said rods upward and hence normally urging said head of each of said rods against the interior surface of said cup, the length of said rods above said cup being sufficiently greater than the vertical distance of travel of said stem and hence said cup to cause the upper ends of said rods to engage said first-named plate before said stem reaches the upper extremity of the upward stroke thereof said first-named plate thereby depressing said rods to cause the said heads thereof to free cut dough from said cup.

JOHN MARTKA.

REFERENCES CITED

The following references are of record in the file of this patent:

UNITED STATES PATENTS

| Number | Name | Date |
|---|---|---|
| 6,963 | Bruce | Mar. 13, 1832 |
| 122,602 | Gunther | Jan. 9, 1872 |
| 719,722 | Bechtel | Feb. 3, 1903 |
| 1,810,864 | Vogt | June 16, 1931 |
| 1,945,755 | Scruggs, Jr. | Feb. 6, 1934 |
| 2,246,949 | Parsons | June 24, 1941 |
| 2,446,201 | Turner | Aug. 3, 1948 |
| 2,454,316 | Haecks | Nov. 23, 1948 |

FOREIGN PATENTS

| Number | Country | Date |
|---|---|---|
| 283,731 | Great Britain | Jan. 19, 1928 |